UNITED STATES PATENT OFFICE.

CHARLES M. JACOB, OF PARIS, FRANCE.

IMPROVEMENT IN COMPOSITION SEALS FOR BOTTLES AND JARS.

Specification forming part of Letters Patent No. 190,865, dated May 15, 1877; application filed October 24, 1876.

*To all whom it may concern:*

Be it known that I, CHARLES MOISE JACOB, of Paris, France, have invented certain Improvements in Capsuling Bottles and Jars, of which the following is a specification:

This invention has for its object improvements in capsuling bottles and jars.

For this purpose I employ a plastic substance, which is applied by simple immersion, and which hardens rapidly on exposure to air, and then forms a perfectly-adhering capsule, quite impervious to moisture, capable of receiving metallic or other color, and whose cost is much smaller than that of metallic foil or capsules.

The compound which I employ for this purpose is composed of about twenty-five per cent. of pyroxyline or gun-cotton, with about seventy-five per cent. of a mixture of vinous or other alcohol and sulphuric ether, to which is added about two per cent. of gutta-percha and powdered metallic bronze, gilt, &c., if a metallic appearance is desired, or suitable coloring matters if it is wished to imitate wax or pitch.

The moist collodion thus obtained is concentrated to a degree suitable for use. This degree of concentration varies according to the thickness it is wished to obtain and the nature of the article to be capsuled. The article is dipped cold into this composition, and on being withdrawn the simple evaporation causes the covering to closely adhere to the surface, and forms a hard and durable skin of any desired appearance.

When the skin of collodion is sufficiently thick, any seal, stamp, or trade-mark can be applied to it. A drawing or label may also be placed on the surface of the article, and be then covered with a thin layer of transparent collodion, so as to preserve without hiding it. For some cases, to give it a greater solidity, I cover the collodion with an amber, resinous, gummy, or gelatinous varnish. It may also be coated with or come after a wash of solution of silicate of soda or potash, of about 35° Baumé, which insures its adherence to the glass.

It is evident that the method of capsuling above described may be employed for numberless purposes which it is needless to enumerate.

Having thus described my invention, what I claim is—

A seal for bottles, jars, &c., consisting of a composition of pyroxyline or gun-cotton, mixed with alcohol or a similar solvent, applied to the vessel after the same has been corked or closed, substantially as described, whereby the same is hermetically sealed, as set forth.

CHARLES MOISE JACOB.

Witnesses:
    M. TAUTREY,
    G. VILLETTE.